United States Patent [19]
Inoue et al.

[11] Patent Number: 5,235,376
[45] Date of Patent: Aug. 10, 1993

[54] CAMERA REMOTE-CONTROLLING APPARATUS

[75] Inventors: Akira Inoue; Masataka Ide; Hitoshi Maeno, all of Hachioji, Japan

[73] Assignee: Olympus Optical Co., Ltd., Tokyo, Japan

[21] Appl. No.: 824,335

[22] Filed: Jan. 23, 1992

[51] Int. Cl.[5] ............................................. G03B 13/36
[52] U.S. Cl. ...................................................... 354/403
[58] Field of Search ..................... 354/400, 402, 403

[56] References Cited
U.S. PATENT DOCUMENTS

| | | | |
|---|---|---|---|
| 4,534,629 | 8/1985 | Bogle et al. | 354/400 |
| 4,601,557 | 7/1986 | Bogle et al. | 354/400 |
| 5,014,080 | 5/1991 | Miyadera | 354/403 |
| 5,119,123 | 6/1992 | Tominaga et al. | 354/402 |
| 5,172,155 | 12/1992 | Kosaka | 354/403 |

Primary Examiner—Russell E. Adams
Attorney, Agent, or Firm—Louis Weinstein

[57] ABSTRACT

In a camera remote-controlling apparatus, the incident angle based on a remote-controlling signal issued from a specific object to be photographed is detected by a signal receiving unit and the position of the object is operated and specified. The photographing optical system is driven to vary the focal length so that the specified object may enter the photographed picture. Further, distance measuring information for the object is detected by a distance measuring part, the photographing optical system is focused and, at the same time, light measuring information for the luminance of the same specified object is detected by, a light measuring part to control the exposure.

23 Claims, 7 Drawing Sheets

CAMERA REMOTE-CONTROLLING APPARATUS

BACKGROUND OF THE INVENTION

1. FIELD OF THE INVENTION:

This invention relates to camera remote-controlling apparatus and more particularly to a camera remote-controlling apparatus whereby a specific object can be detected in the position and photographed as remote-controlled.

2. RELATED ART STATEMENT:

A camera whereby a remote-controlled photographing can be made is already generally known. For example, a camera of Japanese . Patent Application No. 235293/1989 filed by the assignee of the present aplication comprises an incident angle detecting means for detecting the incident angle of a remote-controlling signal, a focus detecting means detecting the focal length of a photographing optical system and an for determining means operating the position of a remote-controlling signal transmitter within a photographed view angle on the basis of the outputs of the above mentioned incident angle detecting means and focal length detecting means and is further provided with a controlling means whereby, in a remote-controlled self-timer photographing in which the photographer himself is an object to be photographed, when it is not judged from the output of the operating means that the above mentioned signal transmitter carried by the photographer is present within the photographed view angle, the photographed view angle will be enlarged by zooming or a warning will be issued so that, in the above mentioned self-timer photographing, when the object is positioned outside the picture, the shutter release will be prohibited or the object will be positioned within the picture by a zooming operation and then the shutter release will be carried out.

In the camera suggested in the above mentioned Japanese Patent Application No. 235293/1989, in its remote-controlled self-timer photographing, the photographer carrying the transmitter can be controlled to be within the photographed picture but, in case this camera is an auto-focus camera, as it is not intended to focus the photographer, the photographer will not be always focused.

Also, in case a conventional auto-focus camera focusing system is applied to the above mentioned camera, usually the auto-focusing will be made on the basis of the nearest distance measuring data among many object distance measuring regions. For example, when the photographer is a specific object to be photographed, when another object is present at a distance nearer than the above mentioned object, if the other object is focused, the above mentioned main object will be "out of focus" to the disadvantage of the desired objective. Further, there has been such disadvantage that not only the focusing operation on the main object but also the exposing condition based on the light measuring information representing the distance measuring information and luminance measuring information of the object can not be properly set.

OBJECTS AND SUMMARY OF THE INVENTION

An object of this invention is to provide a camera remote-controlling apparatus whereby an object issuing a remote-controlling signal is positively put into a photographed picture and is simultaneously focused so that at least the specific object will not be photographed out of focus.

Another object of this invention is to provide a camera remote-controlling apparatus whereby an object issuing a remote-controlling signal is positively put into a photographed picture and, at the same time, the distance measuring information on the specific object and/or the light measuring information measuring the luminance of the above mentioned object is selected and is used as the light measuring information for another strobo-photographing than the above mentioned focusing treatment or for setting another photographing condition so that a proper photographing may be carried out.

The camera remote-controlling apparatus according to the present invention comprises, as shown in FIG. 1, a signal receiving means 2 receiving, as a remote-controlling signal, infrared rays emitted from an object 1 to be photographed, an incident angle detecting means 3 measuring the incident angle of the above mentioned remote controlling signal upon the receiving means 2, a focal length detecting means 4 detecting the focal length of a photographing optical system, a distance measuring means 6 measuring the object distance in a plurality of regions within the photographed picture and/or a light measuring means (not illustrated in FIG. 1) measuring the luminance of the object in a plurality of regions, an for determining means 5 operating the position of the above mentioned object 1 within the photographed picture by the outputs of the above mentioned incident angle detecting means 3 and focal length detecting means 4 and a controlling means 7. By the way, the above mentioned controlling means 7 comprises a controlling means specifying one region in which the above mentioned object is positioned among the respective distance measuring regions of the above mentioned distance measuring means on the basis of the operated results of the above mentioned operating means and focusing the photographing lens on the object within the specified region and/or a controlling means selecting the distance information corresponding to the specific region in which the above mentioned object is positioned among a plurality of distance informations by the above mentioned distance measuring means 6 on the basis of the operated results of the above mentioned operating means 5 and/or a controlling means selecting the light measuring information corresponding to the specific region in which .the above mentioned object is positioned among the light measuring informations in a plurality of regions by the above mentioned light measuring means on the basis of the operated results of the above mentioned operating means 5.

The above, as well as other features and advantages of the present invention will become apparent enough with the following explanation.

DETAILED DESCRIPTION OF THE PREFERRED EMBODIMENT

The embodiment of the present invention shall be explained in the following with reference to the drawings.

Figure 1:
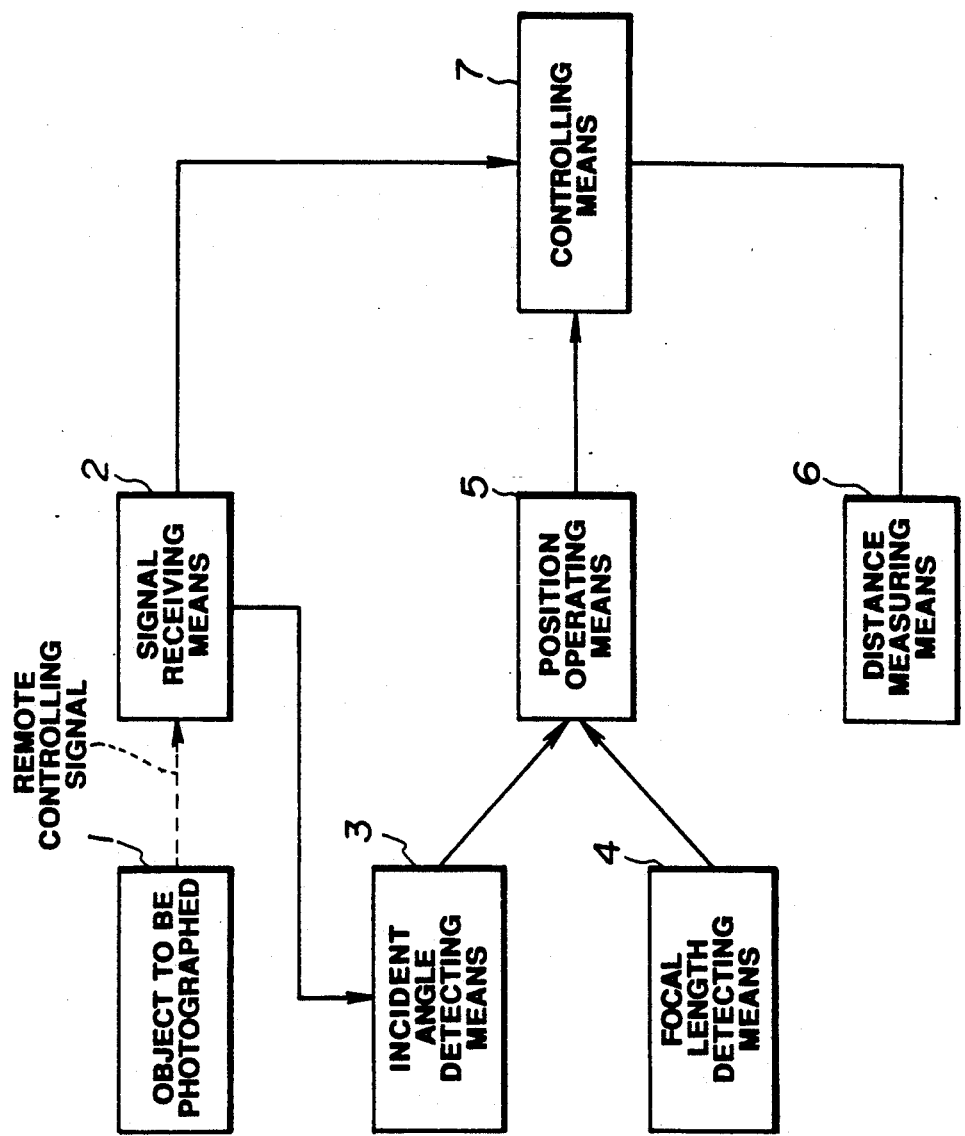
FIG. 1 is a conceptional diagram of a camera remote-controlling apparatus of the present invention.
Figure 2:
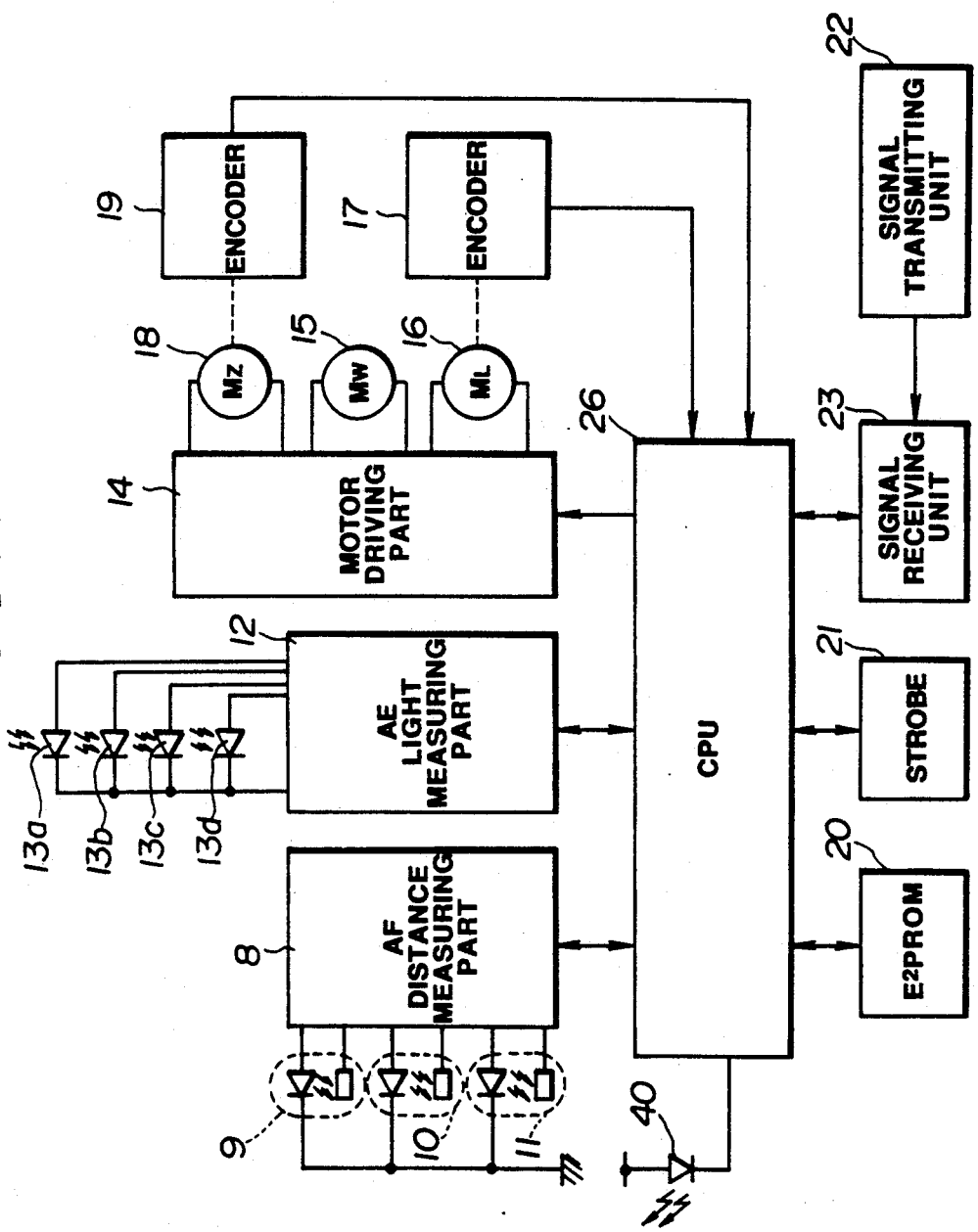
FIG. 2 is a block formation diagram of a camera in which is built-in a remote-controlling apparatus embodying the present invention.

FIG. 2 is a block formation diagram of a camera in which is built-in a remote-controlling apparatus which constitutes one embodiment of the present invention. By the way, the remote-control (mentioned as R-CON hereinafter) has two R-CON photographing modes. That is to say, one of the modes is an R-CON self-timer photographing mode wherein an R-CON signal from an R-CON signal transmitting unit 22 carried by an object to be photographed which is also the photographer is received, an object distance measuring region and a light measuring region measuring the object luminance are selected on the basis of the incident angle and the photographer carrying the signal transmitting unit 22 is put into the picture as a specific object. Further, the other mode is an R-CON photographing mode wherein the photographer carrying the R-CON signal transmitting unit 22 is not made a specific object to be photographed.

The respective components of the above mentioned camera shown in FIG. 2 shall be explained in the following. First of all, the CPU 26 is a central processing unit sequentially controlling the respective components within this camera on the basis of a processing program memorized in a ROM (READ ONLY MEMORY) provided within it and thereby controlling the peripheral components. Also, this CPU 26 has an A/D converting circuit built-in so that, if an analogue voltage is input, it will be A/D converted and will be able to be operated. Further, an for determining means operating the position of the specific object on the basis of the detected outputs of the later described incident angle detecting means and focal length detecting means, a controlling means whereby one region in which the specific object is positioned among the respective distance measuring regions of the distance measuring means is specified on the basis of the operated results of the above mentioned operating means and the photographing lens is focused on the object within the above specified region, a controlling means selecting the distance measuring information of the specified region among the distance measuring informations of a plurality of regions by the above mentioned distance measuring means on the basis of the operated results of the above mentioned operating means and a controlling means selecting or weighting the light measuring information of the specified region among the light measuring informations measuring the luminances of the plurality of regions by the light measuring means are built-in in the CPU 26.

Figure 3:
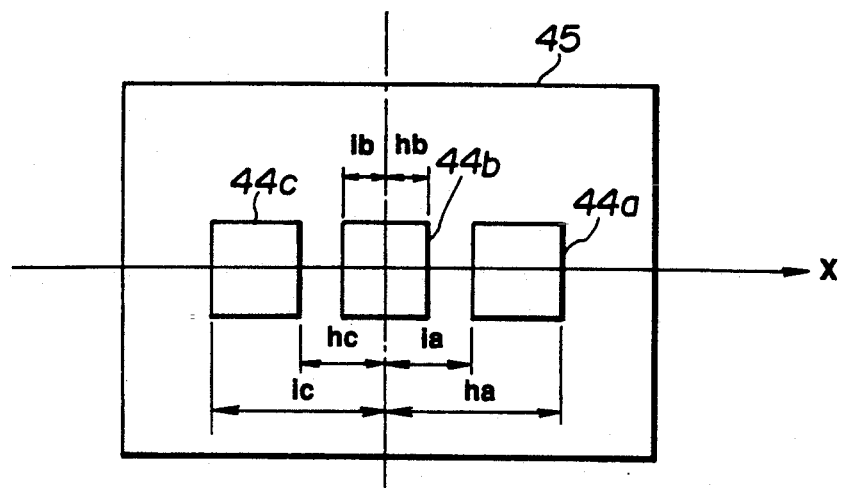
FIG. 3 is a view showing distance measuring regions of the camera shown in FIG. 2.

An AF (auto-focus) distance measuring part 8 which is the above mentioned distance measuring means measures the distance to the object by an infrared ray active system and transfers to the CPU 26 the distance measuring data which are the obtained distance measuring informations of the object. Light projectors and receivers arranged in pairs as shown at 9, 10 and 11 are each formed by arranging an IRD (infrared ray emitting diode) and PSD (position sensing device) as opposed to each other, are connected to the AF distance measuring part 8 and the object distances of the three regions 44a, 44b and 44c in the photographed picture shown in FIG. 3 are measured by these respective pairs of light projectors and receivers 9, 10 and 11. The constants hn and in (n=a, b, c) representing the right and left end positions of the above mentioned respective distance measuring regions 44a, 44b and 44c are memorized in the ROM of the CPU 26. On the photographed picture 45, when its center is made an original point 0 (see FIG. 4), the axis in the long side direction passing through the original point 0 is made an x-axis, these constants hn and in will represent coordinates of the intersections of the respective right ends and left ends of the outer peripheries of the distance measuring regions 44a, 44b and 44c with the x-axis.

Therefore, the ranges of the positions x in the x axial direction of the distance measuring regions 44a, 44b and 44c will be represented respectively by the following formulae:

ha>x>ia(1)

hb>x>ib(2)

hc>x>ic(3).

Now, the AE (automatic exposure control) light measuring part 12 which is the above mentioned light measuring, means measures the object luminance and has light receiving devices 13a, 13b, 13c and 13d for measuring the object luminance. These light receiving devices output to the AE light measuring part 12 light currents corresponding to the object luminances for the three light measuring regions 50a, 50b and 50c and the region 50d outside those regions on the photographed picture 45 shown in FIG. 4. In the AE light measuring part 12, these light currents are converted to voltage signals which are output to the above mentioned CPU 26. In the CPU 26, the voltage signals are A/D converted and are then made light measuring data which are light measuring informations showing the object luminances, the exposure is operated and the back light state is judged. The constants jn and kn (n=a, b, c) representing the ranges of the positions of the above mentioned light measuring regions 50a to 50c are also memorized in the ROM of the CPU 26. On the photographed picture 45, when the center is made an original point 0 and the axis in the long side direction through the original point is made an x axis, the constants jn and kn will represent the coordinates of the intersections of the x axis with the right end and left end of the outer periphery of each of the light measuring regions 50a to 50c. The ranges of the position x in the x axial direction of the light measuring regions 50a to 50c are represented respectively by the following formulae:

$$ja > x > ka \quad (4)$$

$$jb > x > kb \quad (5)$$

$$jc > x > kc \quad (6).$$

Figure 4:
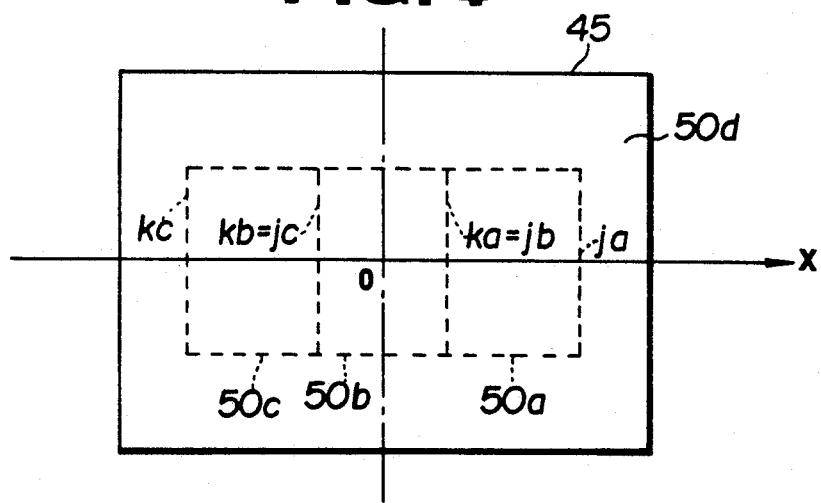
FIG. 4 is a view showing light measuring regions of the camera shown in FIG. 2.

However, as shown in FIG. 4, as the boundary of each region is common, the value ka is equal to ja, the value kb is equal to jc and therefore they can be represented as substituted for each other.

A motor driving part 14 drives a film feeding winding motor 15 (MW), a lens driving and shutter driving lens motor 16 (ML) and a zooming driving zoom motor 18 (MZ). The rotating positions of the above mentioned lens motor 16 and zoom motor 18 are detected respectively by a lens position detecting encoder 17 and an encoder 19 which is a focal length detecting means and the outputs of encoders 17 and 19 are fed to the CPU 26.

An E²PROM 20 is a non-volatile memorizing device and memorizes adjusting data for correcting at the time of production errors generated by the mechanical dispersion or the like of the lens position in the case of converting distance measuring data to lens position data.

A strobe 21 starts charging by the signal of the CPU 26. When the charging ends, the CPU 26 will output a charging stopping signal to the strobe 21.

An R-CON signal transmitting, unit 22 which is a signal transmitting means is adapted to be carried at the time of the above mentioned R-CON photographing by the photographer who is a specified object and to emit an R-CON photographing infrared ray R-CON signal to an R-CON signal receiving unit 23 of a signal receiving means provided on the camera side.

Figure 5:
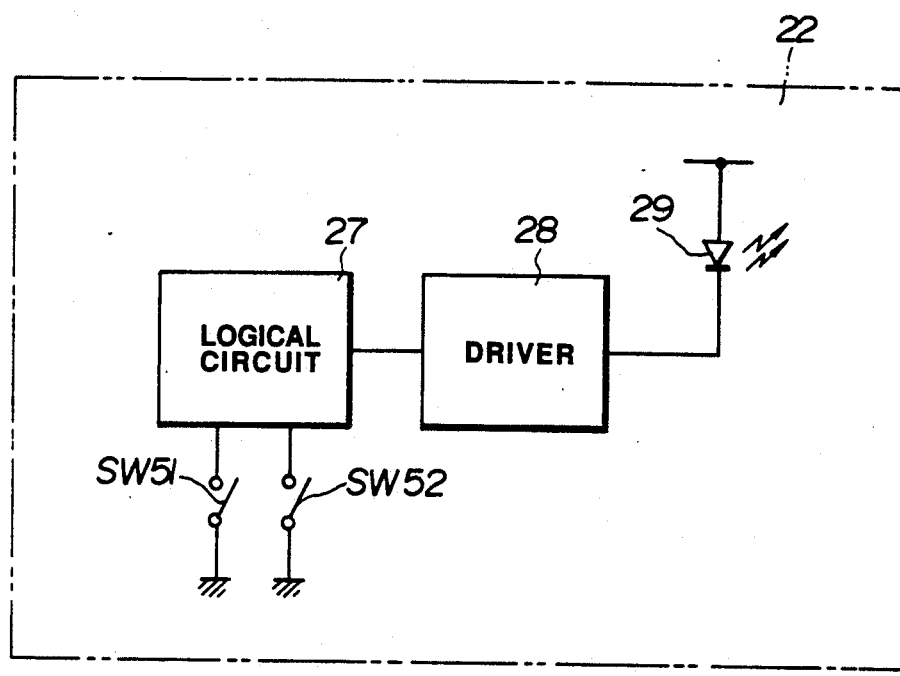
FIG. 5 is a block formation diagram of a signal transmitting unit to be used for the camera shown in FIG. 2.

As shown in the block formation diagram in FIG. 5, the above mentioned signal transmitting unit 22 comprises a logic circuit 27, an R-CON signal infrared ray LED 29 which is a signal transmitting device, a driver 28, an R-CON signal transmitting switch SW 51 and an R-CON self-timer photographing mode setting switch SW 52.

Figure 6:
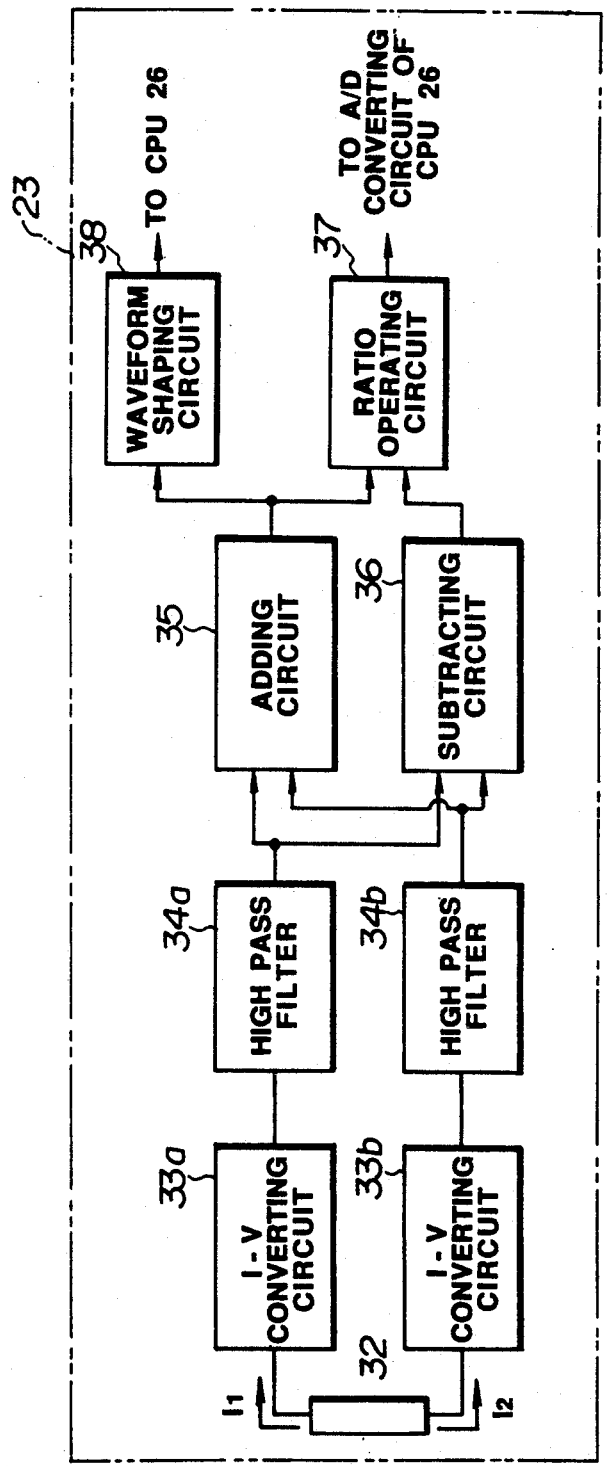
FIG. 6 is a block formation diagram of a signal receiving unit to be used for the camera shown in FIG. 2.

As shown in FIG. 6, the above mentioned signal receiving unit which is a receiving means comprises a PSD (position sensing device) 32 outputting light currents I1 and I2 in response to the incident angle of the R-CON signal light from the above mentioned signal transmitting unit 22, current/voltage converting I-V converting circuits 33a and 33b, band pass filters 34a and 34b, an adding circuit 35, a subtracting circuit 36, a ratio operating circuit 37 whose output is transmitted to the A/D converting circuit of the CPU 26 and a waveform shaping circuit 38 whose output is output to the CPU 26. By the way, the LED 40 shown in FIG. 2 is controlled by the CPU 26 and shows that the above mentioned R-CON signal is received by the signal receiving unit 23.

The principle of calculating the incident angle $\theta_o$ (See FIG. 7) upon the camera of the infrared ray R-CON signal in the above mentioned signal transmitting and receiving units 22 and 23 and the operating formula for determining the specific output D relating to the incident angle $\theta_o$ from the light current shall be explained in the following.

Figure 7:
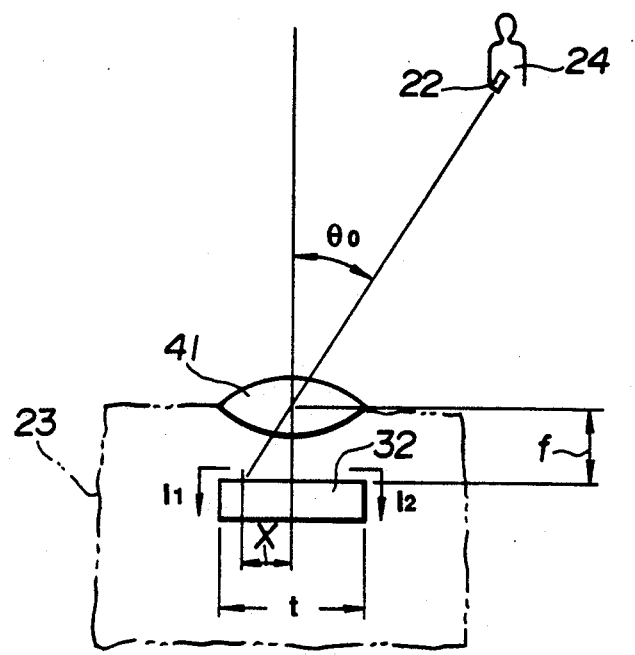
FIG. 7 is a diagram showing a remote-controlling signal of infrared rays incident upon signal transmitting and receiving units of the camera shown in FIG. 2.

When an infrared ray R-CON signal transmitted from the signal transmitting unit 22 carried by the object 24 which is the photographer impinges upon the PSD 32 through the light receiving lens 41 of the signal receiving unit 23, the light currents I1 and I2 will be output from the PSD 32. As shown in FIG. 7, When the center of the PSD 32 coincides with the optical axis of the light receiving lens 41 as an original point, the gravity position of the incident light is represented by x and the effective total length of the PSD 32 is represented by t, the ratio of the light currents I1 and I2 generated by the PSD 32 and branching will be represented by the following formula:

$$I1:I2 = \{(t/2)+x\} : \{(t/2)-x\}$$

Therefore, the ratio output D of the difference (I1−I2) of both light currents to the total currents, that is, the sum (I1+I2) of both light currents will be:

$$D = (I1 - I2)/(I1 + I2) \qquad (7)$$
$$= 2 \cdot x/t.$$

Therefore, if the focal length of the light receiving lens 41 is represented by f and the incident angle of the incident light showing the direction in which the specific object 24 is positioned is represented by $\theta_o$, the above mentioned gravity position x will be represented by $$x = f \cdot \tan \theta_o$$

and therefore the relation of the ratio output D with the incident angle $\theta_o$ will be represented by the following formula:

$$D = 2 \cdot f \cdot \tan \theta_o / t \qquad (8).$$

Therefore, if the ratio output D of the light currents I1 and I2 is determined, the incident angle $\theta_o$ will be able to be calculated on the basis of the above mentioned formula (8).

As shown by the signal receiving unit 23 in FIG. 6, the above mentioned light currents I1 and I2 are converted to voltage signals respectively by I-V converting circuits 33a and 33b. The background light and commercial frequency noise light component included in the above mentioned voltage signals are removed by the high pass filters 34a and 34b and only the R-CON signal light voltage component is detected. This R-CON signal light component is output as a sum (I1+I2) and difference (I1−I2) respectively by the adding circuit 35 and subtracting circuit 36 and further the ratio output D of the above described sum and difference is determined by the ratio operating circuit 37 (See the formula (7)). The ratio output D of the ratio operating circuit 37 is A/D converted by an A/D converting circuit built-in in the CPU 26 and is then operated by the above mentioned formula (8) to determine the incident angle $\theta_o$ of the infrared ray R-CON signal. On the other hand, the output of the above mentioned adding circuit 35 is input into the waveform shaping circuit 38 to have the waveform shaped and is then input into the CPU 26.

Figure 8:
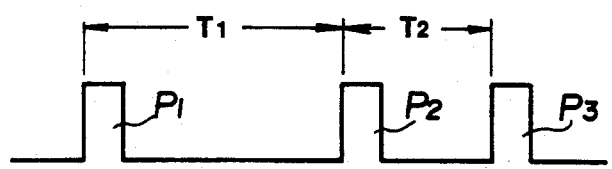
FIG. 8 is a time chart of a remote-controlling signal transmitting pulse at the time of a self-timer photographing mode by a remote-control in the signal transmitting unit of the camera shown in FIG. 2.

Also, in the above mentioned signal transmitting unit 22, by operating the mode setting switch SW52, an R-CON self-timer photographing mode or non-self-timer R-CON photographing mode is set and an R-CON signal based on such photographing mode is transmitted to the signal receiving unit 23. That is to say, for the R-CON self-timer photographing, when the mode setting switch SW52 of the signal transmitting unit 22 is switched off and the R-CON signal transmitting switch SW51 is switched on, a photographing practicing mode signal including autofocusing or the like based on the distance measuring data of the AF distance measuring part 8 will be output. Thereby, the logical circuit 27 will output to the driver 28 pulse signals P1 and P2 at a time interval of T1 shown in FIG. 8 and a pulse signal P3 after a time interval of T2 from the same pulse signal P2 and the infrared light LED 29 will emit the same infrared ray pulse transmitting signal light as represented by the pulse signals P1, P2 and P3 which are R-CON signals.

Figure 9:
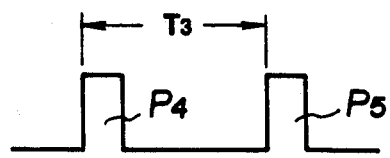
FIG. 9 is a time chart of a signal transmitting pulse at the time of a remote-controlled photographing mode in the signal transmitting unit of the camera in FIG. 2.

Also, for the non-self-timer R-CON photographing, when the switch SW52 of the signal transmitting unit 22 is set on and the switch SW51 is switched on, the R-CON self-timer photographing mode will be released and a photographing practicing mode signal including the autofocus or the like based on the distance measuring data of the AF distance measuring part 8 will be output. Thereby, the logical circuit 27 will output pulse signals P4 and P5 at a time interval of T3 shown in FIG. 9 and the infrared ray LED 29 will emit the same infrared ray pulse transmitting signal light as represented by the pulse signals P4 and P5 which are R-CON signals.

The R-CON operation of the camera of this embodiment formed as in the above shall be explained.

First of all, the operation of the camera when the self-timer photographing by the R-CON operation is made shall be explained. While the photographer who is the specific object 24 sets off the R-CON self-timer photographing mode setting switch SW52 of the R-CON signal transmitting unit 22 (See FIG. 7) from a remote distance position, when the R-CON signal transmitting switch SW 51 is switched on, an R-CON signal transmitting signal will be transmitted toward the PSD 32 of the signal receiving unit 23 on the camera side. By this operation, infrared ray pulses P1, P2 and P3 at time intervals of T1 and T2 shown in FIG. 8 will be emitted from the infrared ray LED 29. When these infrared ray pulses P1, P2 and P3 are incident upon the PSD 32, light currents I1 and I2 corresponding to the incident light gravity positions will be generated. These light currents I1 and I2 are input into the waveform shaping circuit 43 through the I-V converting circuits 33a and 33b, high pass filters 34a and 34b and adding circuit 35, have the waveform shaped and are fed to the CPU 26.

The CPU 26 detects the first pulse P1 of the above mentioned pulse input and then starts measuring elapsed time by means of the built-in counter (not shown for purposes of simplicity). When thee second pulse P2 is input into the CPU 26, measuring time of the above mentioned built-in counter will be stopped and the time interval from the first pulse P1 until the second pulse will be measured. If this time interval from the first pulse until the second pulse coincides with the above mentioned interval T1, the signal will be considered to designate the self-timer photographing by the R-CON or, if the time interval is another interval than T1, the signal will be judged to be a noise. Only in case the time interval coincides with the above mentioned time interval T1, the signal will be judged to designate the R-CON self-timer photographing and the CPU 26 will operate the built-in A/D converting circuit after the lapse of the time interval T2 (See FIG. 8) from the second pulse input P2 and will read in the output D for determining the incident angle $\theta_o$ of the ratio operating circuit 37 obtained by treating the signal of the infrared ray pulse P3.

The ratio output D of this ratio operating circuit shall be explained. The above mentioned infrared ray pulse P3 is incident upon the PSD 32 and is converted to light currents I1 and I2, the light currents I1 and I2 are further converted to a voltage equivalent to the total light currents by the adding circuit 35 through the I-V converting circuits 33a and 33b and high pass filters 34a and 34b, at the same time, a voltage signal equivalent to the difference of the light currents is generated by the subtracting circuit and is input together with the voltage signal equivalent to the above mentioned total light currents into the ratio operating circuit 37 and a voltage signal corresponding to the ratio output of both of them $$D = (I1 - I2) / (I1 + I2)$$

is obtained. As described above, this ratio voltage signal D is input into the A/D converting circuit of the CPU 26 and is A/D converted. The CPU 26 can calculate the incident angle $\theta_o$ of the infrared ray pulse P3 on the basis of the above described principle of calculating the incident angle from this ratio voltage signal D (See the formula (8)).

Figure 10:
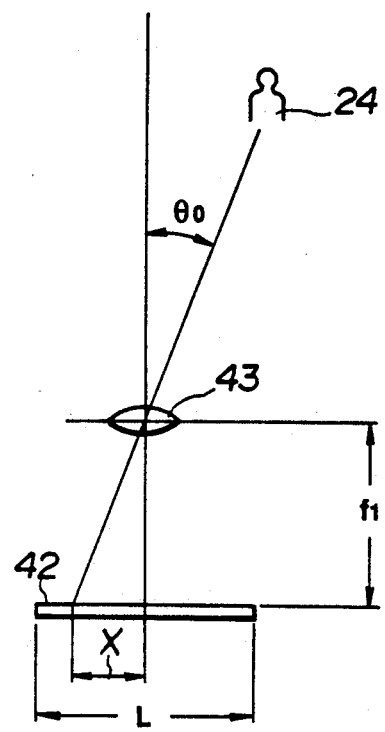
FIG. 10 is an optical arrangement diagram showing the position relation of the photographing optical system and object at the time of the self-timer photographing by the remote control of the camera shown in FIG. 2.

FIG. 10 is an optical arrangement diagram showing the relation between the photographing optical system and the object at the time of the above mentioned R-CON self-timer photographing. As shown in FIG. 10, at an inclination of the above described incident angle $\theta_o$ toward the photographing optical system 43 of a focal length of f1, the above mentioned R-CON transmitted signal is transmitted from the object to be projected on the film photosensitive surface 42. The above mentioned focal length f1 of the photographing optical system 43 can be read out by the output of the encoder 19 of the CPU 26.

If the optical axis of the photographing optical system 43 is made an original point, the position x1 in which the image of the object 24 is projected on the film photosensitive surface 42 will be given by $$x1 = f1 \tan \theta_0.$$

By the value of this incident angle $\theta_o$, the object 24 can be specified and designated. By the way, here, in case the position x1 of the above mentioned object 24 protrudes out of the film photosensitive surface 42, the CPU 26 will drive the zoom motor 18 through the motor driving part 14, will correct the focal length f1 of the photographing lens and will control the object 24 to enter the photographed picture.

Figure 11:
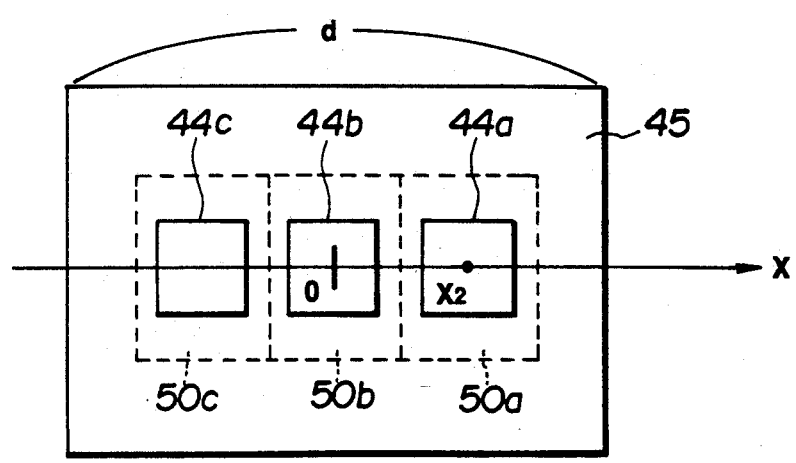
FIG. 11 is a diagram showing the position relation of the distance measuring region and light measuring region with the object image on the photographed picture at the time of the self-timer photographing by the remote control of the camera shown in FIG. 2.

FIG. 11 shows distance measuring regions and light measuring regions on the photographed picture 45. As the photographed picture 45 and film photosensitive surface 42 (See FIG. 10) are equivalent, if the long side of the photographed picture is represented by d and the long side of the film photosensitive surface is represented by L, the position x2 on the photographed picture 45 of the specified object 24 will be given by the following formula $$x2 = f1 \cdot \tan \theta_0 \cdot 2d / 2L \quad (9)$$

and these will be determined by the CPU 26.

On the other hand, in the AF distance measuring part 8, by the instruction of the CPU 26, the distance is measured and the distance measuring data corresponding respectively to the distance measuring regions 44a, 44b and 44c are transferred to the CPU 26 which receives these distance measuring data and then compares the above mentioned position x2 on the photographed picture 45 of the object 24 with the positions of the distance measuring regions 44a, 44b and 44c.

As shown, for example, in FIG. 11, in case the position x2 is present within the distance measuring region 44a, the following formula in which x2 is substituted for x in the above mentioned formula (1) will be satisfied:

$$ha > x2 > ia.$$

Therefore, the respective positions of the distance measuring region 44a and object 24 are considered to coincide with each other and the distance measuring data of the distance measuring region 44a are judged by the CPU 26 to be effective as the distance information of the object 24.

Then the CPU 26 makes the AE light measuring part 12 practice measuring light and the AE light measuring part 12 outputs light measuring output voltages corresponding respectively to the light measuring regions 50a, 50b and 50c (See FIG. 11). The CPU 26 A/D converts the light measuring output voltage and then compares the position x2 with the positions of the light measuring regions 50a to 50c. For example, similar to the above described case, as shown in FIG. 11, when the position x2 is present within the light measuring region 50a, the following formula in which x2 is substituted for x in the above described formula (4) will be satisfied:

$$ja > x2 > ka.$$

Therefore, the positions of the object 24 and light measuring region 50a are considered to coincide with each other and the light measuring data of the object of the light measuring region 50a are judged by the CPU 26 to be effective as the light measuring information of the object 24.

Then, the CPU 26 drives the lens motor 16 through the motor driving part 14 and, on the basis of the distance measuring data of the distance measuring region 44a, the photographing lens of the photographing optical system 43 is driven to the focusing position. Then, the CPU 26 operates the exposure on the basis of the light measuring data corresponding to the light measuring region 50a or practices the exposure by controlling the shutter by weighting the light measuring region 50a. Further, the winding motor 16 is driven to feed the frames of the film to complete a series of sequences. By the way, it is needless to say that, if the relations of the position x2 of the object 24 with the positions of the distance measuring regions 44b and 44c satisfy respectively the following formula;

$$hb > x2 > ib \text{ or}$$

$$hc > x2 > ic,$$

the position of the photographing lens will be controlled on the basis of the distance measuring data of the distance measuring regions 44b and 44c. When the relations of the position x2 of the object 24 with the positions of the light measuring regions 50b and 50c satisfy the following formula:

$$jb > x2 > kb \text{ or}$$

$$jc > x2 > kc,$$

the exposure will be operated and controlled on the basis of the measured light values respectively of the light measuring regions 50b and 50c.

The R-CON photographing mode in which there is no self-timer photographing by the R-CON shall be explained in the following.

The photographer switches on the mode setting switch SW52 of the signal transmitting unit 22, releases the R-CON self-timer photographing mode and sets the R-CON photographing mode. The switch SW51 is switched on and an infrared ray R-CON signal is transmitted to the signal receiving unit 23. Then the infrared ray LED 29 emits infrared ray pulses P4 and P5 at a time interval of T3 shown in FIG. 9. The infrared ray pulses P4 and P5 are then incident upon the PSD 32 of the signal receiving unit 23 shown in FIG. 6 and are converted to light currents I1 and I2 which are input into the adding circuit 35 through the I-V converting circuits 33a and 33b and high pass filters 34a and 34b and are converted to voltage signals equivalent to the total light currents and these voltage signals are input into the waveform shaping circuit 38, have the waveforms shaped in the waveform shaping circuit 38 and are then input into the CPU 26.

When the CPU 26 detects the pulse input by the first light pulse P4 having had the waveform shaped, the timing of the built-in counter will be started. When the second pulse P5 is input, the timing of the above mentioned counter will be stopped and the time interval from the first pulse to the second pulse will be measured. If this time interval coincides with the time T3, the CPU 26 will judge that the R-CON signal by the above mentioned R-CON photographing mode has been received. In this case, the CPU 26 will not refer to the data of the incident angle $\theta_0$ of the R-CON signal on the signal transmitting unit 22. According to the algorithm of the ordinary photographing mode, the distance measuring data corresponding to a plurality of distance measuring regions are selected and the light measuring data corresponding to a plurality of light measuring regions are selected and weighted. On the basis of the results, the position of the photographing lens is controlled and the exposure is controlled to complete a series of sequences.

In case the object not specifying the photographer is thus to be R-CON photographed, by releasing the R-CON self-timer photographing mode, irrespective of the position of the photographer carrying the signal transmitting unit 22, the R-CON photographing can be made.

As described above, in the case of the R-CON self-timer photographing, on the basis of the R-CON transmitted signal from the object 24 which is the photographer carrying the signal transmitting unit 22, the above mentioned self-timer photographing mode is confirmed, further the position of the photographer is detected, the photographer is specified as the object and the object is focused and is controlled in the exposure. Therefore, according to the R-CON self-timer photographing with the camera of this embodiment, such defects that the photographer to be the specified object is not contained within the photographed picture and that the object which is the photographer is "out of focus" can be avoided from occurring. In the light emission control in the strobo-photographing, as the distance information to the photographer to be the specified object can be determined, a proper strobo-photographing can be made. Further, such defects that the light measuring region in which the main object is not positioned is selected in the exposure control, that the light measuring region in which the specified object is not positioned is greatly weighted, that the condition proper also at the time of the back light photographing is not determined and thus that the exposure condition for the photographer who is the specified object is not proper can be avoided from occurring.

By the way, the camera of this embodiment is provided with both of the AF distance measuring part 8 and AE light measuring part 12 but, needless to say, the R-CON apparatus of the present invention can be applied also to a camera having only either of the AF distance measuring part 8 and AF light measuring part 12.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A camera remote-controlling apparatus comprising:
    a signal receiving means receiving, as a remote-controlling signal, infrared rays emitted from an object to be photographed;
    an incident angle detecting means responsive to said infrared rays for measuring an incident angle of said remote-controlling signal upon said receiving means;
    a focal length detecting means for detecting the focal length of a photographing optical system;
    a distance measuring means for measuring object distance in a plurality of predetermined regions within a photographed picture;
    an operating means for determining the position of said object within the photographed picture responsive to outputs of said incident angle detecting means and focal length detecting means; and
    a controlling means specifying one region among the respective predetermined distance measuring regions of said distance measuring means responsive to the operated results of said operating means, for controlling the focal length of said photographing optical system so that the object within said specified region may enter the photographed picture and focusing the photographing lens on the object within said region.

2. A camera remote-controlling apparatus according to claim 1 further comprising a signal transmitting means for transmitting an infrared ray remote-controlling signal to said signal receiving means.

3. A camera remote-controlling apparatus according to claim 2 wherein said signal transmitting means has a switch for switching between a first mode and a second mode and means responsive to said first mode for issuing a remote-controlling signal for requesting the signal receiving means to determine the position of said object within the photographed picture and responsive to said second mode for issuing another remote-controlling signal request.

4. A camera remote-controlling apparatus according to claim 3 wherein a remote-controlling signal transmitted from said signal transmitting means distinguishes a remote-controlling signal for requesting a determination of the position of said object within the photographed picture from other remote-controlling signals by generating signals having different pulse intervals.

5. A camera remote-controlling apparatus comprising:
    a signal receiving means receiving, as a remote-controlling signal, infrared rays emitted from an object to be photographed;
    an incident angle detecting means sensitive to said infrared rays for measuring the incident angle of said remote-controlling signal upon said receiving means;
    a focal length detecting means for detecting the focal length of a photographing optical system;
    one of a distance measuring means for measuring the object distance in a plurality of predetermined regions within the photographed picture and a light measuring means for measuring the object luminance in a plurality of predetermined regions within the photographed picture;
    an operating means for determining the position of said object within the photographed picture by the outputs of said incident angle detecting means and focal length detecting means; and
    a controlling means for performing one of the operations including, by use of a distance selecting means, selecting the distance measuring information corresponding to the specific region in which said object is positioned from a plurality of distance informations by said distance measuring means on the basis of the operated result of said operating means and by use of a controlling means, controlling the exposure by weighting the light measuring information of the specific region in which said object is positioned and by use of light measurement selecting means, selecting the light measuring information of the specific region among the light measuring information showing the luminance of a plurality of regions by said light measuring means on the basis of the operated result of said operating means.

6. A camera remote-controlling apparatus according to claim 5 wherein a plurality of predetermined distance measuring regions of the distance measuring means and a plurality of predetermined luminance measuring regions of the light measuring means are determined as correlated.

7. A camera remote-controlling apparatus according to claim 2 wherein said signal transmitting means includes means for manual operation by an object for operating said signal transmitting means.

8. A camera remote-controlling apparatus according to claim 1 further comprising a signal transmitting means for transmitting an infrared ray remote-controlling signal to said signal receiving means, said signal transmitting means including manually operable means having first and second mode positions and means responsive to said first and second mode positions for generating a plurality of pulses wherein the time intervals between the plurality of pulses generated when operating in said first mode have time intervals different from the time intervals between the pulses generated when operating in said second mode.

9. A camera remote-controlling apparatus according to claim 8 wherein said camera further includes means for receiving said pulses from said signal transmitting means; and means for determining the time intervals between said pulses and means responsive to said determined time intervals for determining the operating mode.

10. A method for controlling a camera from a remote location comprising the steps of:

(a) dividing the image field to be photographed into a plurality of regions;

(b) determining an object distance in each of said regions;

(c) determining the focal length of a taking lens employed by the camera;

(d) measuring, at the photographing location, the angle of incident of infrared rays directed from an object in one of said regions to the photographing location;

(e) determining the position of the object within the image field responsive to the incident angle and focal length values obtained in steps (c) and (d);

(f) determining from the position information obtained in step (e) the region in which the object transmitting the infrared rays is located; and (g) focusing the taking lens according to the distance value measured for said region obtained in step (b).

11. The method of claim 10 wherein step (d) further includes the step of generating infrared pulses arranged at spaced predetermined intervals and the step of receiving said infrared pulses, and measuring the intervals between said pulses and enabling steps (e), (f) and (g) to be performed only when said pulse intervals meet predetermined criteria.

12. The method of claim 10 further comprising the step of:

(h) measuring the light illumination reflected from each of said aforementioned predetermined regions; and (i) utilizing the information obtained in step (h) from the region occupied by the object generating said infrared rays for controlling the photographing operation.

13. The method of claim 10 further comprising the step of:

(h) measuring the luminance of light reflected from each of said aforementioned predetermined regions; and weighting the light measuring information obtained in step (h) of the specific region in which said object is positioned to provide a weighted value and using said weighted value for the photographing operation.

14. The method of claim 10 further comprising the step of:

determining from step (e) whether or not the object transmitting the infrared rays is in one of said predetermined regions; and adjusting the taking lens to bring the last-mentioned object into an image field.

15. A method for operating a camera from a remote location comprising the steps of:

(a) generating infrared rays in the form of pulses directed from a remote location to said camera;

(b) spacing the infrared pulses at predetermined first set of time intervals to identify a first mode of operation and spacing the infrared pulses by a second set of time intervals different from said first step of time intervals for identifying a request for a second mode of operation;

(c) detecting the infrared pulses at said camera and determining the time intervals between pulses;

(d) comparing said time intervals with first and second sets of predetermined criteria and selecting a first operating mode when said pulse intervals meet said first set of criteria and selecting a second operating mode when said pulse time intervals meet said second set of criteria;

(e) determining the angle of incidence of said infrared pulses at said camera;

(f) measuring the distance of objects within predetermined regions of the image field to be photographed;

(g) determining the focal length of a taking lens employed by the camera for the photographing operation;

(h) determining the position of the object transmitting the infrared rays responsive to the incidence angle determined in step (e) and the focal length value determined in step (g);

(i) determining, responsive to selection of said first operating mode, the predetermined region in which said object generating said infrared rays is located; and (j) utilizing the distance information for the region selected in step (a) to focus the taking lens.

16. The method of claim 15 further comprising the steps of:

(k) measuring the luminance of light reflected from each of said aforesaid predetermined regions of the image field; and (l) utilizing the luminance information obtained in step (k) for the region in which the object transmitting said infrared pulses for use in the photographing operation.

17. The method of claim 15 further comprising the step of:

(k) measuring the luminance of light reflected from each of said aforesaid predetermined regions of the image field; and (l) weighting the luminance information obtained in step (k) for the region in which the object transmitting said infrared pulses and employing the weighted information for use in the photographing operation.

18. A camera remote-controlling apparatus comprising:

a signal receiving means receiving, as a remote-controlling signal, infrared rays emitted from an object to be photographed;

an incident angle detecting means sensitive to said infrared rays for measuring the incident angle of said remote-controlling signal upon said receiving means;

a focal length detecting means for detecting the focal length of a photographing optical system;

one of a distance measuring means for measuring the object distance in a plurality of predetermined regions within the photographed picture;

an operating means for determining the position of said object within the photographed picture by the outputs of said incident angle detecting means and focal length detecting means; and a controlling means for selecting the distance measuring information corresponding to the specific region in which said object is positioned from among a plurality of distance informations by said distance measuring means on the basis of the operated result of said operating means.

19. A camera remote-controlling apparatus according to claim 18, further comprising:

a light measuring means for measuring the object luminance in a plurality of predetermined regions within the photographed picture; and controlling means for controlling the exposure by weighting the light measuring information of the specific region in which said object is positioned.

20. A camera remote-controlling apparatus according to claim 18, further comprising:

light measuring means for measuring the object luminance in a plurality of predetermined regions within the photographed picture; and means responsive to said light measurement selecting means, for selecting the light measuring information of the specific region among the light measuring information showing the luminance of a plurality of regions by said light measuring means on the basis of the operated result of said operating means.

21. A camera remote-controlling apparatus comprising:

a signal receiving means receiving, as a remote-controlling signal, infrared rays emitted from an object to be photographed;

an incident angle detecting means responsive to said infrared rays for measuring the incident angle of said remote-controlling signal upon said receiving means;

distance measuring means for measuring object distance in a plurality of predetermined regions within an image plane to be photographed;

means for determining the position of said object to be photographed within the image plane responsive to an output of said incident angle detecting means; and means for selecting one region among the respective predetermined distance measuring regions respective to the output of said determining means for adjusting the focal length of said photographing optical system.

22. A camera according to claim 21 wherein said incidence angle detecting means further comprises means for determining the focal length of the optical system at the time an incidence angle is being determined.

23. A camera according to claim 21 further comprising feedback means coupled to said optical system for providing a signal representative of the focal length of the optical system; and means for terminating an adjustment of the optical system when the signal from said feedback means compares with an adjustment control signal.

* * * * *